(12) United States Patent
Westley (10) Patent No.: US 9,227,254 B2
(45) Date of Patent: Jan. 5, 2016

(54) LARGE ANGULAR DISPLACEMENT ASSEMBLY FOR PRESS TOOLS

(75) Inventor: Todd Westley, Elyria, OH (US)

(73) Assignee: EMERSON ELECTRIC CO., St. Louis, MO (US)

( * ) Notice: Subject to any disclaimer, the term of this patent is extended or adjusted under 35 U.S.C. 154(b) by 435 days.

(21) Appl. No.: 13/544,187

(22) Filed: Jul. 9, 2012

(65) Prior Publication Data

US 2014/0007434 A1    Jan. 9, 2014

(51) Int. Cl.
*B26B 15/00* (2006.01)
*B26B 13/00* (2006.01)
*B23D 17/06* (2006.01)
*B23D 29/00* (2006.01)
*B21F 11/00* (2006.01)

(52) U.S. Cl.
CPC .............. *B23D 17/06* (2013.01); *B23D 29/002* (2013.01); *B21F 11/00* (2013.01)

(58) Field of Classification Search
CPC ...... B23D 23/00; B23D 29/002; B23D 17/06; B26D 3/16; B21F 1/00; B21F 11/00
USPC ..................... 30/226, 227, 228, 245; 72/452.8
See application file for complete search history.

(56) References Cited

U.S. PATENT DOCUMENTS

| 492,931 | A | * | 3/1893 | Baird | 30/180 |
|---|---|---|---|---|---|
| 1,104,495 | A | * | 7/1914 | Hansen | 30/245 |
| 1,440,264 | A | * | 12/1922 | Arn | 30/180 |
| 2,516,946 | A | * | 8/1950 | Barone | 30/245 |
| 2,990,613 | A | * | 7/1961 | Keane et al. | 30/180 |
| 3,177,583 | A | * | 4/1965 | Fischer et al. | 30/180 |
| 3,372,479 | A | * | 3/1968 | Fischer | 30/180 |
| 3,372,480 | A | * | 3/1968 | Rozmus | 30/193 |
| 3,670,411 | A | * | 6/1972 | Peters | 30/180 |
| RE33,002 | E | | 8/1989 | Brick | |
| 4,934,172 | A | | 6/1990 | Bush et al. | |
| 5,083,971 | A | | 1/1992 | Karubian et al. | |
| 6,739,172 | B2 | | 5/2004 | Wagner | |
| 7,216,523 | B2 | | 5/2007 | Frenken | |
| 2004/0064954 | A1 | * | 4/2004 | Schmidt | 30/251 |
| 2007/0044316 | A1 | * | 3/2007 | Bohlman et al. | 30/134 |
| 2007/0261467 | A1 | | 11/2007 | LeFavour et al. | |

FOREIGN PATENT DOCUMENTS

JP      2-60682    *   3/1990

* cited by examiner

*Primary Examiner* — Hwei C Payer
(74) *Attorney, Agent, or Firm* — Mark E. Bandy; Rankin, Hill & Clark LLP (57) ABSTRACT

A tool head using a scissor style pair of jaws is described. The jaws may be provided with cutting, pressing, crimping, or other functional surfaces. The tool head includes a linearly positionable member which is engaged with the jaws. Upon linear displacement of the member, the jaws are pivotally displaced.

16 Claims, 6 Drawing Sheets

FIG. 10

LARGE ANGULAR DISPLACEMENT ASSEMBLY FOR PRESS TOOLS

FIELD

The present subject matter relates to a large angular displacement mechanism for press tools, and particularly for an assembly for cutting large diameter cables.

BACKGROUND

Tools having scissor jaws are well known. For example, scissor jaw tools for cutting, crimping, and other applications have been used for many years. Such tools typically include a pair of jaws which are pivotally attached to one another. Applying a force on handle ends attached to a pair of jaws to bring the handle ends together, results in a corresponding displacement at the other end, i.e. the working end, of the jaws. As will be appreciated, depending upon the relative location at which the jaws are pivotally attached to each other, significant force multiplication can be produced at the working end of the jaws.

Scissor jaws have also been used in conjunction with press tools. Press tools typically utilize a linearly displaceable member such as a hydraulic piston which when extended, engages a scissor jaw assembly. Although relatively large closure forces can be expressed at the working end of the jaws, certain known assemblies are significantly limited in the extent to which the jaws can be opened. For example, for many such assemblies, a maximum opening angle is about 20 degrees. This in turn limits the size of workpieces such as items to be cut or pressed, which can be placed between the jaws.

Therefore, in order to cut, press, or perform work upon a relatively large workpiece, an even larger tool head must be provided. Larger tool heads require heavier and more robust members, are heavier and bulkier, and may be too large to use in certain applications in which space is limited.

Accordingly, a need exists for a tool head using a scissor jaw and engagement assembly in which the jaws can be opened relatively wide to thereby accept large workpieces.

SUMMARY

The difficulties and drawbacks associated with previously known tools are overcome in the present tool and related methods.

In one aspect, the present subject matter provides a tool head comprising a pair of jaws pivotally attached to one another by a single pivot. Each jaw has a frontwardly directed nose, a generally oppositely directed rear face, and a rearwardly directed cam member. The jaws are positionable between (i) an open position in which the noses of each jaw are spaced apart and (ii) a closed position in which at least a portion of a lateral face region of one jaw is disposed immediately adjacent to and alongside at least a portion of a lateral face region of another jaw. The tool head also comprises a linearly displaceable member having a pair of forwardly directed cam surfaces in contact with the rearwardly directed cam members of the pair of jaws. Upon forward displacement of the member, camming engagement between the cam surfaces and the cam members results in pivotal displacement of the jaws.

In another aspect, the present subject matter provides a tool head comprising a first side plate defining a forwardly directed nose and an oppositely directed rear, and a pivot aperture. The tool head also comprises a second side plate spaced from and oriented generally parallel with the first side plate. The second side plate defines a forwardly directed nose and an oppositely directed rear, and a pivot aperture. The tool head also comprises a first jaw member disposed between the first side plate and the second side plate. The first jaw defines a forwardly directed nose, an oppositely directed cam member, a work surface, an inwardly directed lateral face region, and a pivot aperture. The tool head also comprises a second jaw member disposed between the first side plate and the second side plate. The second jaw defines a forwardly directed nose, an oppositely directed cam member, a work surface, an inwardly directed lateral face region, and a pivot aperture. The first side plate, the second side plate, the first jaw member, and the second jaw member are aligned such that the pivot aperture of the first side plate, the pivot aperture of the second side plate, the pivot aperture of the first jaw, and the pivot aperture of the second jaw are defined along a common center axis. The tool head additionally comprises a linearly displaceable member disposed between the first side plate and the second side plate, and rearward of the first jaw and the second jaw. The linearly displaceable member defines at least one forwardly directed cam surface in contact with at least one of the cam member of the first jaw and the cam member of the second jaw.

In still another aspect, the present subject matter provides a tool head comprising a linearly displaceable member defining a forwardly directed cam surface. The cam surface includes a first cam surface region defined within at least a portion of a left hand face of the cam surface and a second cam surface region defined within at least a portion of a right hand face of the cam surface. The tool head also comprises a first jaw member having a forwardly directed nose region and a rearwardly directed cam member. The tool head additionally comprises a second jaw member having a forwardly directed nose region and a rearwardly directed cam member. The second jaw is pivotally attached to the right side of the first jaw member. Upon forward displacement of the member, contact between at least one of (i) the rearwardly directed cam member of the first jaw and the first cam surface region, and (ii) the rearwardly directed cam member of the second jaw and the second cam surface region, results in pivotal displacement of at least one of the first jaw and the second jaw.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter provides a tool and in particular, a tool head assembly for releasable engagement with a press tool. The tool head assembly includes a pair of pivotally attached jaws which include rearwardly directed cam members. The tool head assembly also includes a linearly displaceable slidable member which defines a forwardly directed cam face. The cam face engages or contacts the cam members of the jaws. Thus, upon linear displacement of the slidable member, the jaws are pivotally displaced and typically closed. In certain embodiments of the present subject matter, the jaws are aligned alongside one another such that at least a portion of the first jaw is on the left or right side of the second jaw. This side-by-side orientation of the jaws is maintained during pivotal displacement of the jaws. In such embodiments, the cam face of the forwardly directed slidable member includes a first cam surface region defined within at least a portion of a left hand face of the cam face, and a second cam surface region defined within at least a portion of the right hand face of the cam face. The left hand face and the right hand face of the cam face are divided or separated by a plane bisecting a rearward face of the slidable member and extending along the longitudinal axis of the slidable member. These and other aspects of the present subject matter are described in greater detail herein.

FIGS. 1-8 illustrate a tool head 10 in accordance with the present subject matter. The tool head 10 generally comprises a pair of side plates spaced apart such as a first side member 20 and a second side member 30. Each plate or member defines a frontwardly directed nose or nose regions and a rearwardly directed rear or rear regions. Specifically, the first side member 20 defines nose regions 22 and oppositely directed rear regions 24. And, the second side member 30 defines nose regions 32 and rear regions 34. Each side plate may also define an aperture for receiving a pivot pin associated with the jaws, described in greater detail herein. Thus, the first side member 20 defines a pivot aperture 23 and the second side member 30 defines a pivot aperture 33. A work or access region is accessible along the front of the side plates at which work surfaces of the jaws can be accessed as described in greater detail herein.

Specifically, the first side member 20 defines a work region 26 between the nose regions 22. And, the second side member 30 defines a work region 36 between the nose regions 32. Each of the plates or side members typically define one or more engagement apertures that can be used when releasably engaging the tool head 10 with a press tool (not shown) as known in the art. Specifically, the first side member 20 defines an engagement aperture 21 and the second side member 30 defines an engagement aperture 31 (best shown in FIG. 8). The side members 20 and 30 are affixed to one another as described in greater detail herein and spaced apart from one another to thereby define a tool head interior region between the side members. The side members 20 and 30 are also typically aligned with one another such that the engagement apertures 21 and 31 are defined along a common center axis. Moreover, it is also generally preferred that each of the side members 20 and 30 have the same or similar shape and size and are oriented such that their corresponding nose regions 22 and 32 are aligned, their rear regions 24 and 34 are aligned, and their work regions 26 and 36 are aligned. However, it will be appreciated that the present subject matter includes a wide array of configurations including nonsymmetrical side members and irregular orientations.

Figure 1:
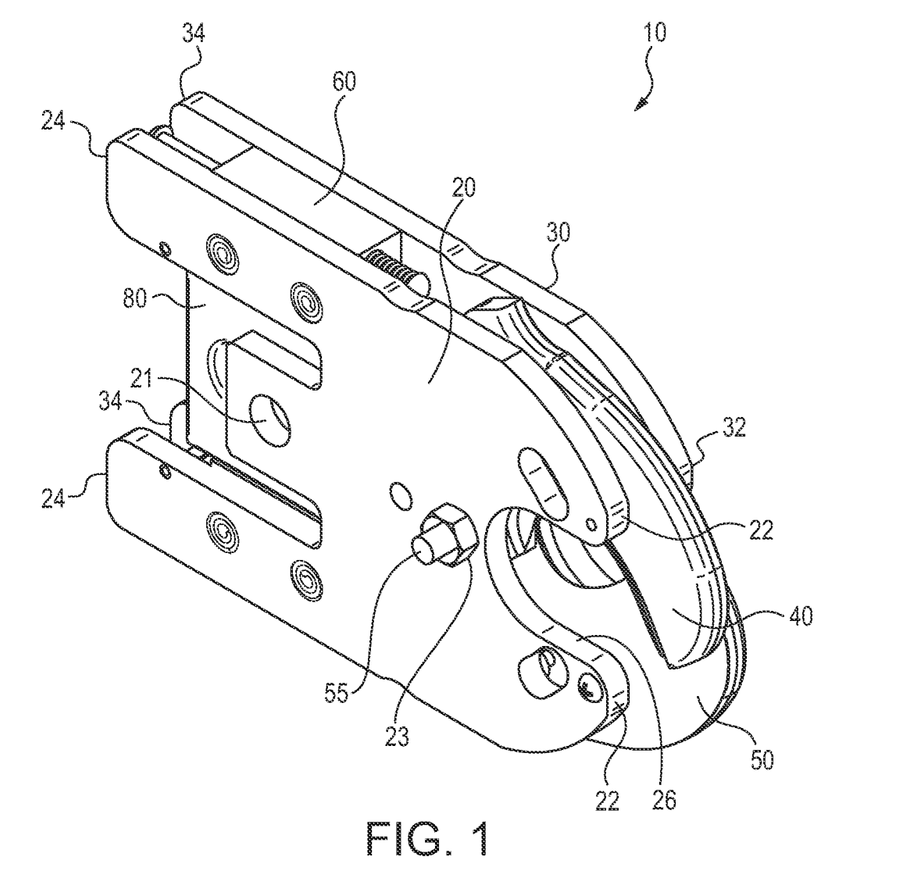
FIG. 1 is a front perspective view of a tool head in accordance with the present subject matter.
Figure 2:
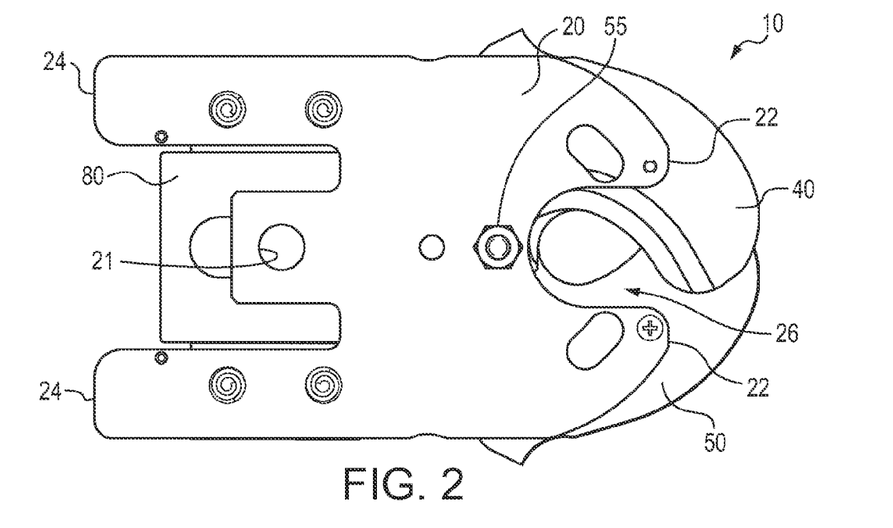
FIG. 2 is a side elevational view of the tool head depicted in FIG. 1.
Figure 3:
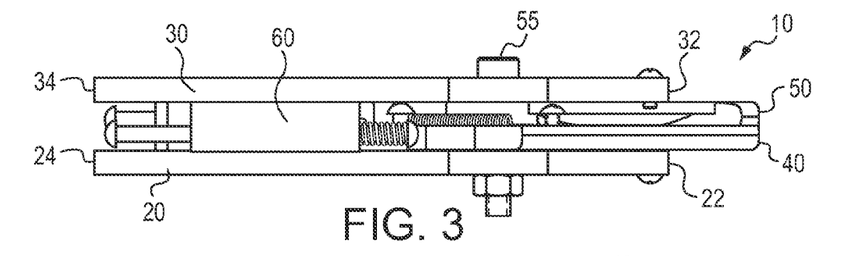
FIG. 3 is a top view of the tool head of FIG. 1.
Figure 4:
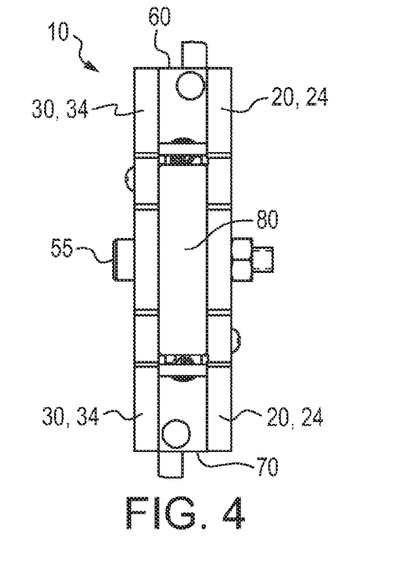
FIG. 4 is a rear end view of the tool head of FIG. 1.
Figure 5:
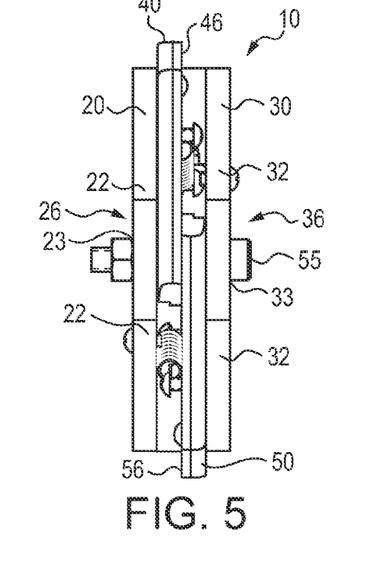
FIG. 5 is a front end view of the tool head of FIG. 1.

The tool head 10 also comprises a pair of jaw members. Specifically, the jaw members can be in the form of a first jaw 40 and a second jaw 50 movably disposed between the pair of side plates or members 20 and 30. Typically, the jaw members 40 and 50 are pivotally attached to one another and also pivotally attached to the side members 20 and 30. A pivot pin assembly 55 can be used and extends through the first side plate 20, the first jaw 40, the second jaw 50, and the second side plate 30, and specifically through corresponding and aligned pivot apertures defined in each of these members. Each jaw member 40, 50 typically includes a forwardly directed nose region 42, 52, an oppositely directed cam member, a pivot aperture, and a work surface. In certain versions of the jaws, the jaws are configured such that during closing of the jaws at least a portion of a lateral face region of one jaw is disposed immediately adjacent to or contacts, at least a portion of a lateral face region of another jaw. Referring to FIG. 5 for example, an inwardly directed lateral face region 46 of the first jaw 40 and an inwardly directed lateral face region 56 of the second jaw 50 are shown. These lateral face regions 46 and 56 are generally directed toward one another and may contact one another. These aspects are described in greater detail herein.

The tool head 10 also comprises a pair of guide members affixed to the side plates and a slidable cam member which is slidably received and/or engaged with the guide members. Specifically, a first guide member 60 is disposed between the side members 20 and 30, and a second guide member 70 is disposed between the side members 20 and 30. A slidable cam member 80 is positioned between the first and second guide members 60 and 70 and as described in greater detail herein, is linearly moveable along an axis generally extending between the front and the rear of the tool head 10. As explained in greater detail herein, a forwardly directed cam surface 84 (best shown in FIG. 6) defined along the cam member 80 is in contact and camming engagement with rearwardly directed cam members 44 and 54 (best shown in FIGS. 6 and 7) associated with each of the jaws 40 and 50, respectively. Thus, upon linear displacement of the cam member 80; the jaws 40, 50 are pivotally displaced relative to one another, as a result of their pivotal affixment to the side members 20, 30 and camming engagement with the cam member 80. Generally, as the cam member 80 is linearly displaced toward the nose region(s) of the tool head, the jaws 40, 50 are pivotally displaced toward one another or "closed."

Figure 6:
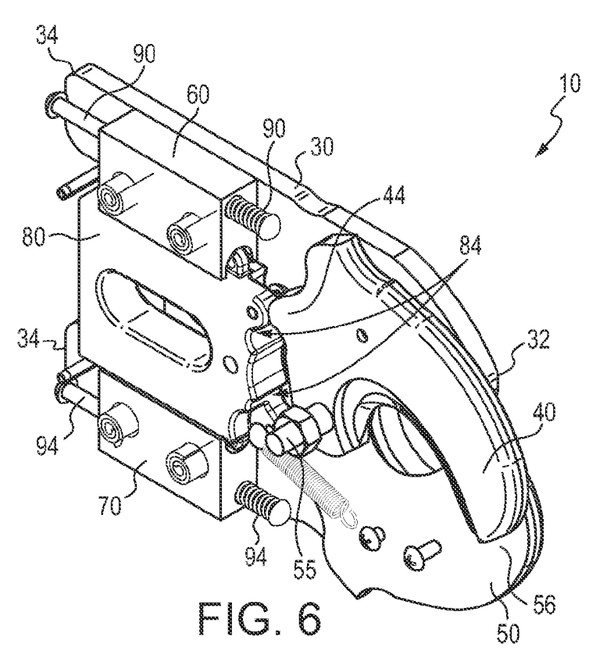
FIG. 6 is a front perspective view of the tool head of FIG. 1 having a side member removed to reveal an interior region of the tool head.
Figure 7:
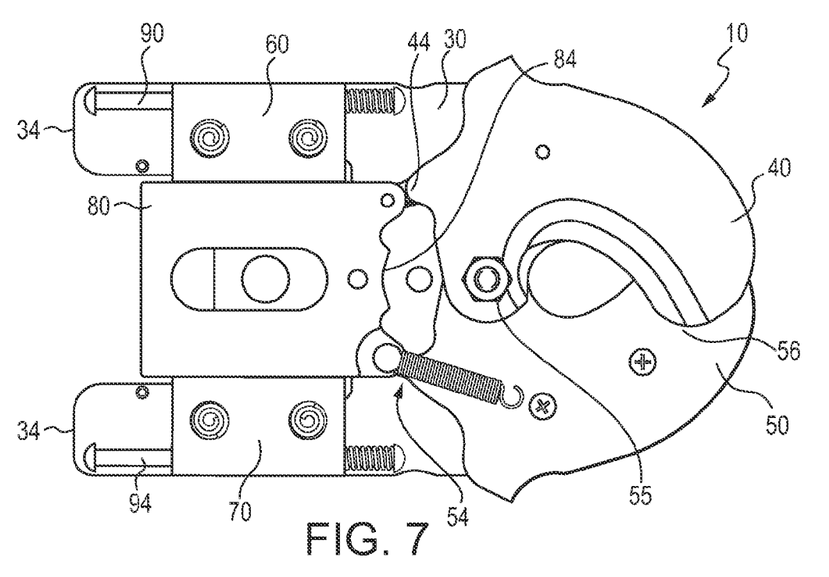
FIG. 7 is a side elevational view of the tool head depicted in FIG. 6.

FIGS. 6 and 7 are views of the tool head 10 having the first side member 20 removed to thereby further reveal the first jaw 40, the second jaw 50, the first guide member 60, the second guide member 70, the slidable cam member 80, and other aspects and components as follows. As illustrated in FIG. 6, the slidable cam member 80 is disposed between the first and second guide members 60 and 70. A forwardly directed cam surface 84 defined by the cam member 80 receives and is in contact with rearwardly extending cam members of the jaws such as a first cam member 44 extending from the first jaw 40 and a second cam member extending 54 from the second jaw 50. Generally, the cam surface 84 of the slidable member 80 is in contact with both cam members 44 and 54 of the jaws 40, 50. However, the present subject matter includes assemblies in which camming engagement occurs between only one of the cam members 44 and 54 and the cam surface 84.

Each of the guide members may optionally include provisions for engaging a jaw member to preclude travel of the jaw member beyond a designated extent or angle. For example, the first guide member 60 includes a first stop assembly 90 which generally comprises a longitudinal member threadedly engaged within the first guide member 60 having a spring assembly directed toward a rear portion of the first jaw 40. Upon pivotal opening of the jaw 40, a rearwardly directed region of the jaw 40 eventually contacts the spring assembly of the first stop assembly 90 which thereby precludes further pivotal opening of the jaw 40. Similarly, a second stop assembly 94 is provided in association with the second guide member 70. The second stop assembly 94 generally comprises a longitudinal member threadedly engaged within the second guide member 70 having a spring assembly directed toward a rear portion of the second jaw 50. Upon pivotal opening of the jaw 50, a rearwardly directed region of the jaw 50 eventually contacts the spring assembly of the second stop assembly 94 which thereby precludes further pivotal opening of the jaw 50.

Figure 8:
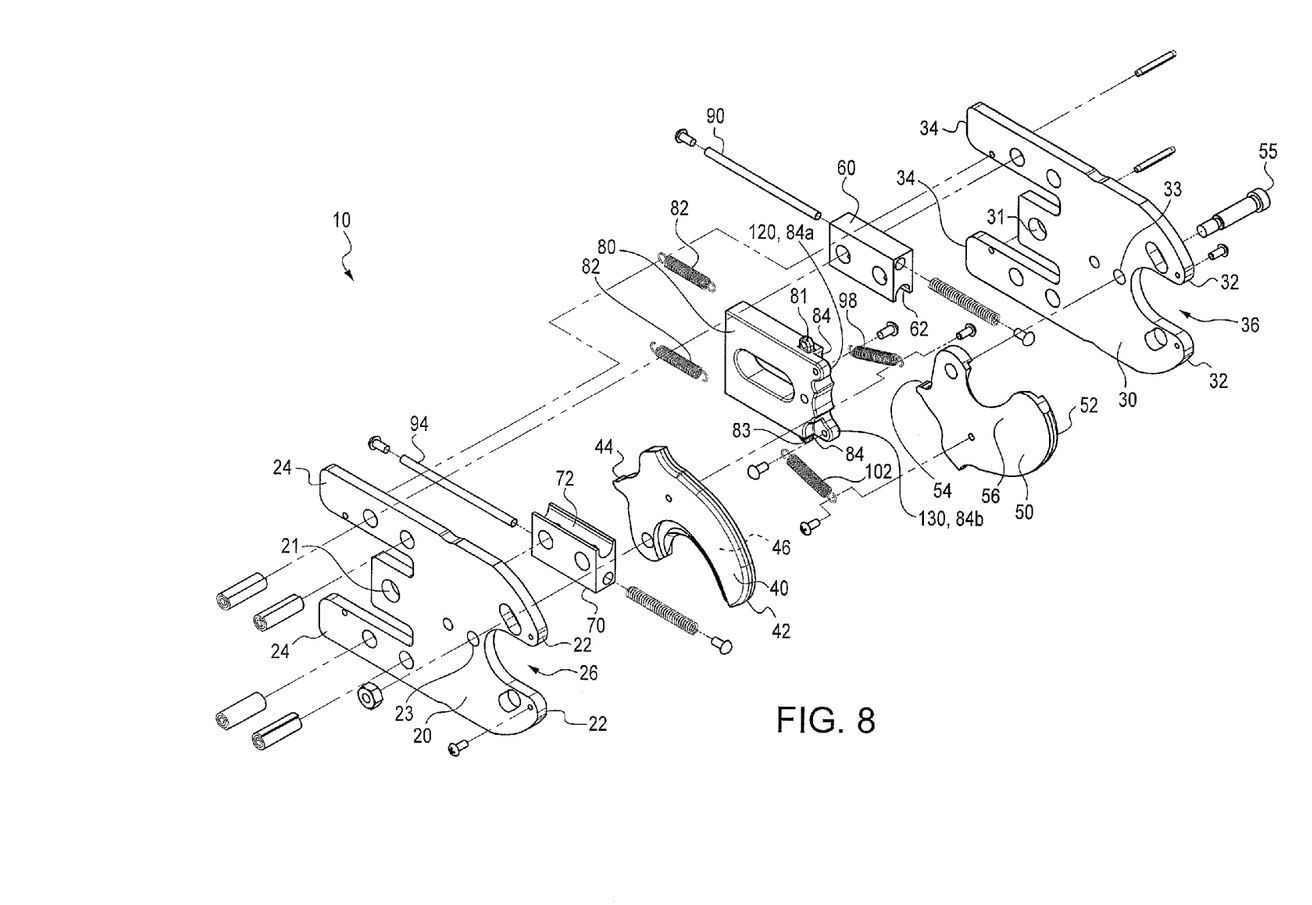
FIG. 8 is an exploded assembly view of the tool head of FIG. 1.

FIG. 8 is an exploded assembly view of the tool head 10. FIG. 8 illustrates orientation and arrangement of the various components relative to one another. Additional aspects are as follows. The slidable member 80 may also include outwardly extending rollers or other low friction members which are slidably received in channels formed in the guide members 60, 70. For example, the slidable member 80 includes a first member 81 which is slidably received in a channel 62 defined in the guide member 60. Similarly, the slidable member also includes a second member 83 which is slidably received in a channel 72 defined in the guide member 70.

The slidable member 80 also includes one or more cam surfaces for contacting cam members associated with the jaws. Thus, upon linear displacement such as forward displacement of the slidable member 80, camming engagement between the cam surfaces and the jaw cam members results in pivotal displacement of the jaws. Specifically, the slidable member 80 defines the previously noted forwardly directed surface 84 which can include one or more cam surface regions. That member 80 includes a forwardly extending member 120 that defines an arcuate outer cam surface region 84a of the cam surface 84. The member 120 is positioned along the face of the slidable member 80 so as to be generally aligned with the cam member 44 of the jaw 40. And, the slidable member 80 also includes another forwardly extending member 130 that defines another arcuate outer cam surface region 84b of the cam surface 84. The member 130 is positioned along the face of the slidable member 80 so as to be generally aligned with the cam member 54 of the jaw 50. Typically, the forwardly extending members 120, 130 are spaced apart from one another and are symmetrically arranged on the slidable member 80 relative to a plane bisecting the member 80 along its longitudinal axis. The tool head 10 also includes springs 82 and 102.

EXAMPLES

A collection of large cable samples having sizes of 250 mcm, 300 mcm, 350 mcm, 400 mcm, 500 mcm, 600 mcm, and 750 mcm were subjected to a cutting operation by a tool head having a pair of cutting jaws corresponding to the present subject matter. The tool head was engaged and operated by a hydraulic press tool. During each cutting operation of a sample, the tool force was measured as a function of tool travel. Tool force was determined by measuring the hydraulic pressure on the piston in the press tool by use of a pressure transducer and multiplying the measured pressure by the piston surface area. Tool travel was measured by using a linear variable differential transformer (LVDT) mechanically attached to the ram end of the press tool.

Figure 9:
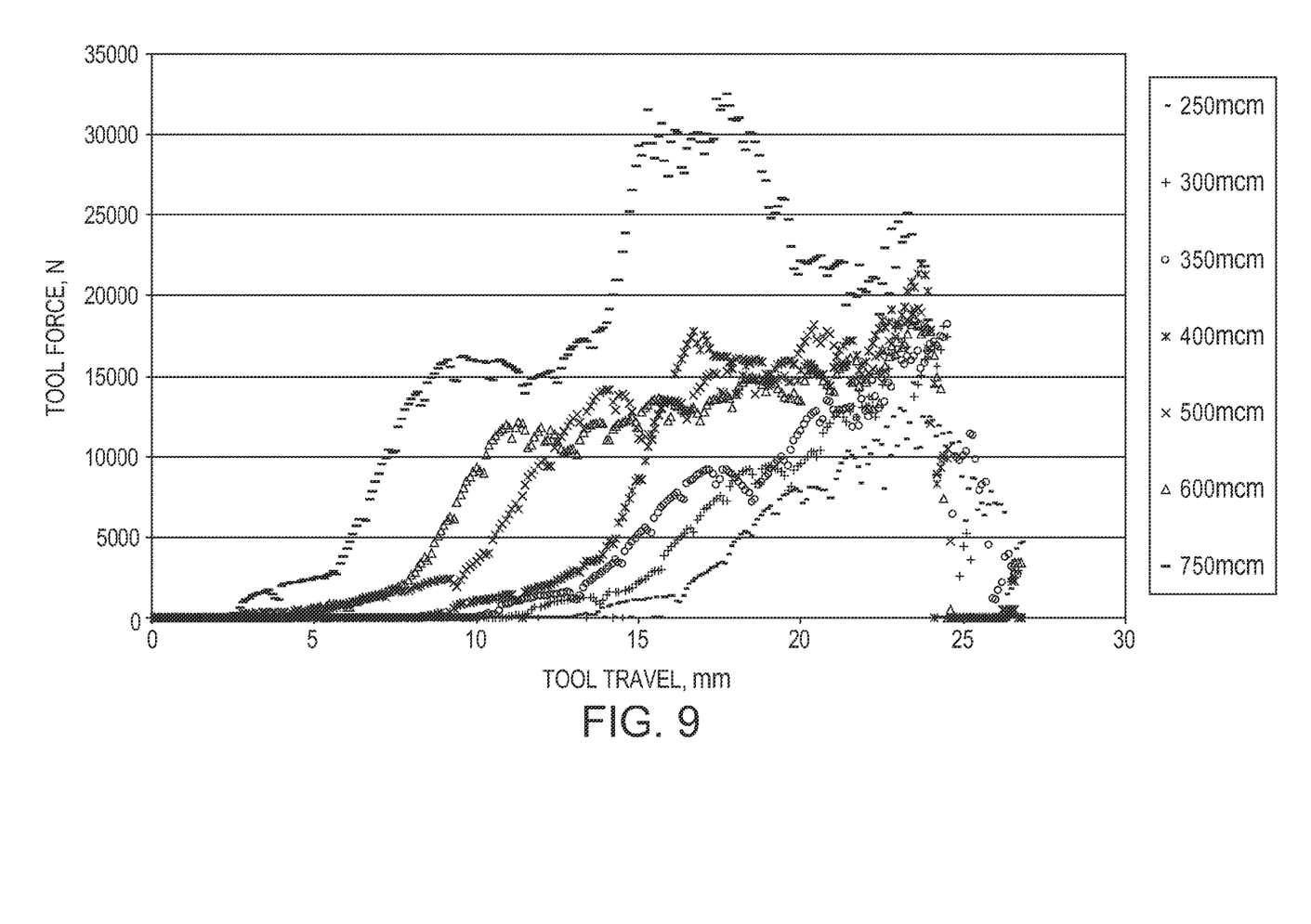
FIG. 9 is a graph of force measured at the jaws of a cutting tool in accordance with the present subject matter as a function of tool travel for various wire samples during cutting operations.

FIG. 9 graphically illustrates the measurements of tool force and travel for each of the cables cut. As shown, relatively large cutting forces are exhibited over each of the cutting operations. At the onset of each cutting operation, the jaws of the tool head were opened to receive the relatively large diameter cables. And, in all instances, the cables were completely cut and thus the jaws were closed, within a tool travel of between about 25 to about 27 mm. The jaws were able to pivotally open to a large dimensional opening to thereby accept and cut each of the noted cables.

Figure 10:
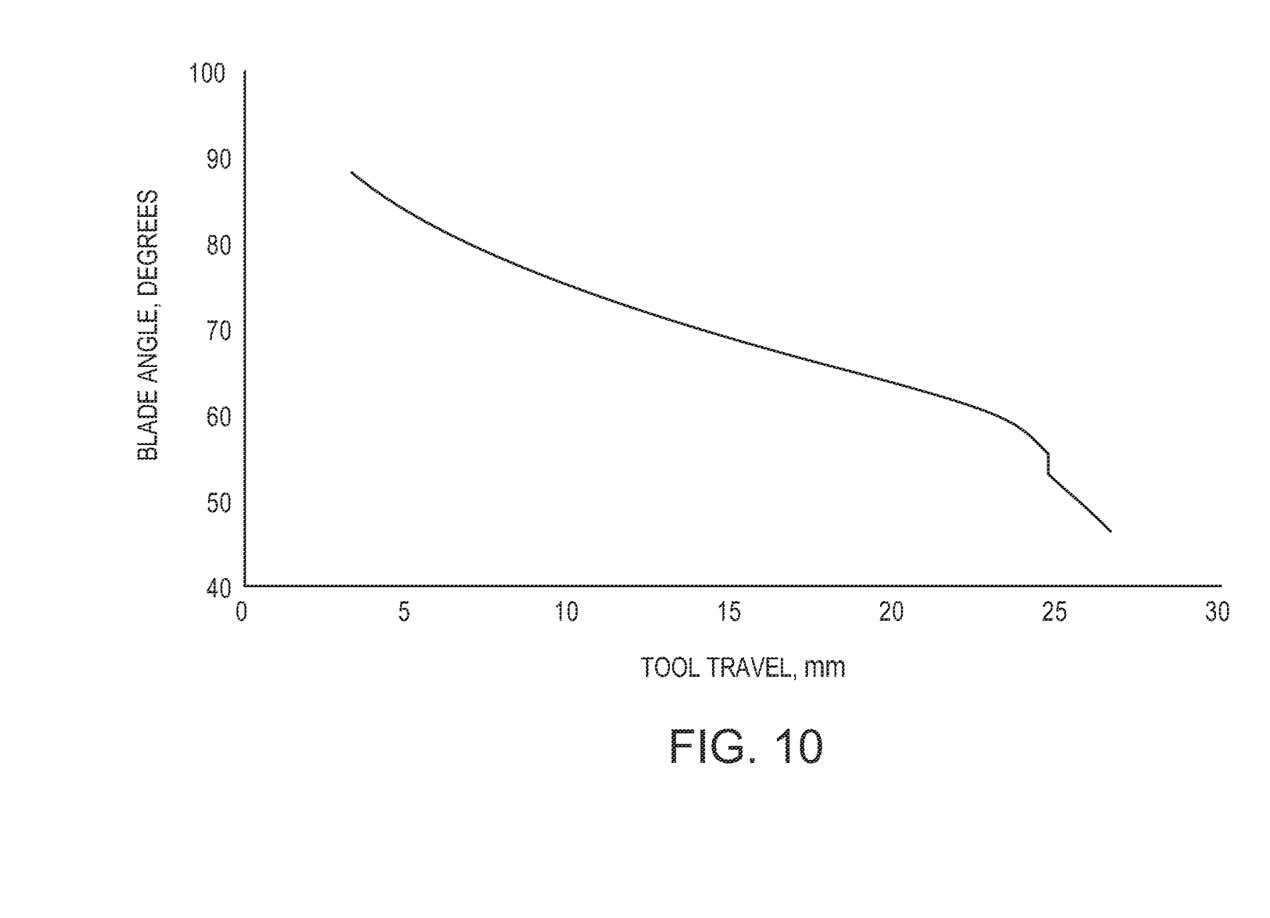
FIG. 10 is a graph of blade angle as a function of tool travel of a tool head in accordance with the present subject matter.

FIG. 10 is a graph of a blade opening angle between the jaws of a tool head according to the present subject matter as a function of tool travel. As evident in the graph, a change of approximately 40 degrees can be realized by a linear tool travel of only about 20 mm, e.g. closing the jaws from an approximately 90 degree configuration to about 50 degrees required a linear tool travel of only about 20 mm. This demonstrates another unique and beneficial property of the present subject matter.

Many other benefits will no doubt become apparent from future application and development of this technology.

All patents, published applications, and articles noted herein are hereby incorporated by reference in their entirety.

As described hereinabove, the present subject matter overcomes many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A tool head comprising:
 a pair of jaws pivotally attached to each other by a single pivot, each jaw having a frontwardly directed nose, a generally oppositely directed rear face, and a rearwardly directed cam member, the jaws positionable between (i) an open position in which the noses of the jaws are spaced apart and (ii) a closed position in which at least a portion of a forwardly directed nose region of a lateral face region of one jaw is disposed immediately adjacent to and alongside at least a portion of a forwardly directed nose region of a lateral face region of the other jaw;
 a linearly displaceable member having a pair of forwardly directed cam surfaces in contact with the rearwardly directed cam members of the pair of jaws;
 wherein upon forward displacement of the linearly displaceable member, camming engagement between the cam surfaces and the cam members results in pivotal displacement of the jaws; and
 a first stop assembly and a second stop assembly, each stop assembly having a spring assembly directed toward a rear portion of a corresponding jaw, wherein upon pivotal opening of the jaws, a rearwardly directed region of each jaw eventually contacts the spring assembly of a corresponding stop assembly thereby precluding further pivotal opening of the jaws.

2. The tool head of claim 1 further comprising:
 a pair of side plates spaced apart from each other, wherein the pair of jaws and the linearly displaceable member are positioned between the pair of side plates.

3. The tool head of claim 2 wherein the pair of jaws are attached to the pair of side plates by the single pivot.

4. The tool head of claim 1 further comprising:
 a first guide member slidably engaged with the linearly displaceable member.

5. The tool head of claim 4 further comprising:
 a second guide member slidably engaged with the linearly displaceable member.

6. The tool head of claim 5 wherein each of the first guide member and the second guide member are disposed rearward of the pair of jaws.

7. The tool head of claim 1 wherein at least one of the jaws includes a cutting surface.

8. A tool head comprising:
 a first side plate defining a forwardly directed nose and an oppositely directed rear, and a pivot aperture;
 a second side plate spaced from and oriented generally parallel with the first side plate, the second side plate defining a forwardly directed nose and an oppositely directed rear, and a pivot aperture;
 a first jaw member disposed between the first side plate and the second side plate, the first jaw member defining a forwardly directed nose, an oppositely directed cam member, a work surface, an inwardly directed lateral face region, and a pivot aperture;
 a second jaw member disposed between the first side plate and the second side plate, the second jaw member defining a forwardly directed nose, an oppositely directed cam member, a work surface, an inwardly directed lateral face region, and a pivot aperture, wherein the first side plate, the second side plate, the first jaw member, and the second jaw member are aligned such that the pivot aperture of the first side plate, the pivot aperture of the second side plate, the pivot aperture of the first jaw member, and the pivot aperture of the second jaw member are defined along a common center axis;
 a linearly displaceable member disposed between the first side plate and the second side plate, and rearward of the first jaw member and the second jaw member, the linearly displaceable member defining at least one forwardly directed arcuate cam surface in contact with at least one of the cam member of the first jaw member and the cam member of the second jaw member;
 wherein the linearly displaceable member includes a first forwardly extending member that defines a first arcuate outer cam surface region of the arcuate cam surface, the linearly slidable member also includes a second forwardly extending member that defines a second arcuate outer cam surface region of the arcuate cam surface, the forwardly extending members are spaced from each other and are symmetrically arranged on the linearly displaceable member relative to a plane bisecting the linearly displaceable member along its longitudinal axis.

9. The tool head of claim 8 further comprising:
 a pivot pin extending through the pivot aperture of the first side plate, the pivot aperture of the second side plate, the pivot aperture of the first jaw member and the pivot aperture of the second jaw member.

10. The tool head of claim 8 wherein upon forward displacement of the linearly displaceable member, contact between the cam surface of the linearly displaceable member and at least one of the cam member of the first jaw member and the cam member of the second jaw member results in pivotal displacement of the jaw members.

11. The tool head of claim 8 wherein the first jaw member and the second jaw member are pivotally positionable between (i) an open position in which the noses of the jaw members are spaced apart, and (ii) a closed position in which at least a portion of the inwardly directed lateral face region of the first jaw member is disposed immediately adjacent to and alongside at least a portion of the inwardly directed lateral face region of the second jaw member.

12. The tool head of claim 8 further comprising:
 a first guide member disposed between and affixed to the first side plate and the second side plate;
 a second guide member disposed between and affixed to the first side plate and the second side plate;
 wherein the linearly displaceable member is in slidable engagement with the first guide member and the second guide member.

13. A tool head comprising:
 a linearly displaceable member defining a forwardly directed cam surface, the cam surface including a first arcuate cam surface region defined within a left hand face of the cam surface and a second arcuate cam surface region defined within a right hand face of the cam surface, wherein the left hand face and the right hand face are separated by a plane bisecting a rearward face of the linearly displaceable member;
 a first jaw member having a forwardly directed nose region and a rearwardly directed cam member; and
 a second jaw member having a forwardly directed nose region and a rearwardly directed cam member, the second jaw member pivotally attached to the right side of the first jaw member;
 wherein, upon forward displacement of the linearly displaceable member, contact between at least one of (i) the rearwardly directed cam member of the first jaw member and the first arcuate cam surface region, and (ii) the rearwardly directed cam member of the second jaw member and the second arcuate cam surface region, results in pivotal displacement of at least one of the first jaw member and the second jaw member; and
 a first stop assembly and a second stop assembly, each stop assembly having a spring assembly directed toward a rear portion of a corresponding jaw member, wherein upon pivotal opening of the jaw members, a rearwardly directed region of each jaw member eventually contacts the spring assembly of a corresponding stop assembly thereby precluding further pivotal opening of the jaw members.

14. The tool head of claim 13 further comprising:
 a pair of side plates spaced apart from each other, wherein at least portions of the first jaw member and the second jaw member are disposed between the pair of side plates.

15. The tool head of claim 14 further comprising:
 a pair of guide members disposed between the pair of side plates and spaced apart from each other, wherein the linearly displaceable member is slidably disposed between the pair of guide members.

16. The tool head of claim 1 wherein the cam surfaces are arcuate cam surfaces.

* * * * *